United States Patent [19]

Stone

[11] Patent Number: 4,555,385

[45] Date of Patent: Nov. 26, 1985

[54] ELUTION PROCESS AND APPARATUS AND EXTRACTION OF PARTICULATE MATERIAL FROM A VESSEL

[75] Inventor: Alan M. Stone, Melbourne, Australia

[73] Assignee: Ok Tedi Mining Limited, Australia

[21] Appl. No.: 524,663

[22] Filed: Aug. 19, 1983

[30] Foreign Application Priority Data

Aug. 23, 1982 [AU] Australia ............................. PF5515
Jul. 8, 1983 [AU] Australia ............................. PG0204

[51] Int. Cl.$^4$ .................. B01D 11/02; C01C 3/08; C22B 3/02; G05D 9/00
[52] U.S. Cl. .................................... 423/30; 423/27; 423/29; 75/101 R; 75/105; 75/118 R; 266/168; 266/267; 406/25; 406/120; 406/124; 422/110; 422/112; 422/219; 422/233; 422/281; 422/293; 422/295
[58] Field of Search .................. 423/25, 27, 29, 30, 423/658.5, 68, 98, 109, 131, 132, 150; 75/105, 106, 107, 118 R, 101 R; 266/168, 170, 188, 267; 422/261, 281, 293, 295, 232, 233, 110, 112, 219; 406/25, 120, 124, 125, 126; 502/24

[56] References Cited

U.S. PATENT DOCUMENTS

| | | | |
|---|---|---|---|
| 2,813,781 | 11/1957 | Mertes | 422/261 |
| 3,880,598 | 4/1975 | van der Toorn et al. | 422/219 |
| 3,920,403 | 11/1975 | Ross | 423/27 |
| 3,990,857 | 11/1976 | Vandenhoek | 422/219 |
| 4,188,208 | 2/1980 | Guay | 423/29 |

FOREIGN PATENT DOCUMENTS

| | | | |
|---|---|---|---|
| 27909 | 5/1981 | European Pat. Off. | 406/120 |
| 932056 | 7/1963 | United Kingdom | 422/281 |

Primary Examiner—John Doll
Assistant Examiner—Jeffrey E. Russel
Attorney, Agent, or Firm—Larson and Taylor

[57] ABSTRACT

An introduction process and apparatus is described concerning the continuous elution of a value, i.e. a metal value such as gold, from a particulate carrier by a counterflow of stripping liquid through the pressurized vessel in which the loaded particulate carrier is introduced to the vessel as a low velocity plug in a liquid carrier. The extraction process is also used with the continuous elution process in which the particulate material is extracted from the bottom part of a pressure vessel through a discharge pipe extending therefrom and in which a discharge liquid is introduced into the discharge pipe upstream of the discharge end under such pressure as to maintain a head of the discharge liquid upstream of that location and a flow of the liquid downstream from the location to transport the particulate material through the discharge pipe. The length of the pipe allows a pressure drop in the particulate material whereby it is discharged at ambient pressure without mechanical working of the material and the discharge liquid may also act to cool the material.

36 Claims, 4 Drawing Figures

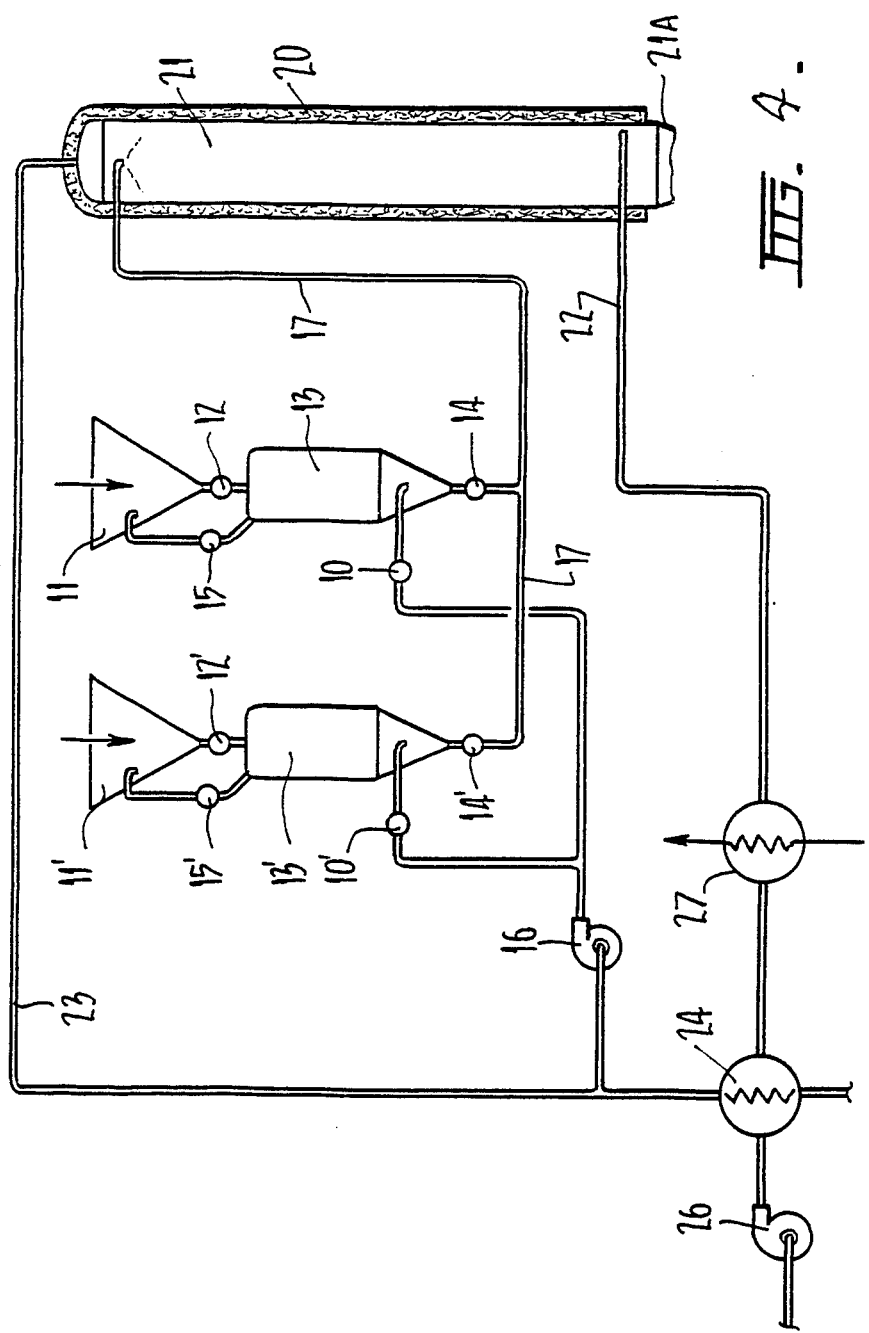

ELUTION PROCESS AND APPARATUS AND EXTRACTION OF PARTICULATE MATERIAL FROM A VESSEL

This invention relates generally to the extraction of values from particulate material and is particularly, but not essentially, concerned with a continuous elution process. Elution processes are particularly useful in the recovery of gold.

This invention also relates generally to processes in which it is necessary to extract particulate material from a pressure vessel. One particular process where this becomes a problem is the carbon-in-pulp process for gold recovery.

Commercial gold extraction plants commonly use the carbon-in-pulp process in which the gold is captured in particles of active carbon and is subsequently stripped from the carbon by means of a stripping liquid in an elution process. Depending on the preliminary treatment, the gold may be captured in the carbon as specks of metal, as traces of complex cyanides or other salts or in all of these forms. The stripping liquid may be an aqueous solution of sodium hydroxide (NaOH) and sodium cyanide (NaCN).

Conventional carbon-in-pulp plants employ batch processes for stripping the carbon of gold. This is satisfactory for relatively small throughputs but when large quantities of gold are to be handled it becomes necessary to use a multiplicity of large stripping vessels for batch processing in parallel, which involves a large capital investment and inefficient use of materials. Carbon-in-pulp batch gold stripping processes are conducted at elevated temperature and pressure and such temperatures and pressures must be reduced at the end of each batch to alleviate the likelihood of flashing. Accordingly a few problems arise in introducing and extracting the carbon and stripping liquid to and from the stripping vessel.

U.S. Pat. No. 3,920,403 proposes a continuous stripping operation, in which gold-loaded carbon is contacted with a flowing stream of stripping solution, preferably in counterflow fashion, at a solution flow rate adjusted to allow achievement of, or approach to, equilibrium between gold in solution and gold absorbed on the carbon. U.S. Pat. No. 3,920,403 proposes further that the contacting occur in an upright, elongated columnar pressure vessel which is provided with heating means and that the stripping solution is pressurized at least to the autogenous pressure developed within the column by a pump and is passed via a conduit upwardly through the column in counterflow relationship to the gold-loaded carbon contained in the column. Although U.S. Pat. No. 3,920,403 proposes the use of a pressurised stripping vessel there is no discussion as to how the carbon is introduced into and extracted from the vessel, the specification merely showing that pressurized strip solution is introduced to the vessel through the carbon outlet and that the loaded solution is exhausted from the vessel through the carbon inlet.

It has been found that the introduction to and extraction from a pressure vessel of a particulate material may present many problems. One such problem is that without care a substantial proportion of a particulate material such as carbon may be broken down into fines as it is introduced to and extracted from a pressure vessel. This presents problems in carbon filtering systems since carbon fines are not suitable for adsorbing metal and other values.

According to a first aspect of the present invention there is provided a continuous elution process for stripping a value, such as gold, from a particulate carrier loaded with the value by means of a stripping liquid, in which the loaded particulate carrier is fed to one end part of a pressurized stripping vessel and is displaced through the stripping vessel in counterflow to the stripping liquid introduced under pressure to the opposite end part of the stripping vessel whereby the particulate carrier is stripped of the value, the unladen particulate carrier being removed from said opposite end part of the stripping vessel and the loaded stripping liquid being removed from said one end part of the stripping vessel, and wherein the loaded particulate carrier is introduced under pressure into said one end part of the stripping vessel in a liquid carrier which comprises the stripping liquid. By the first aspect of the present invention breaking down of the particulate carrier may be alleviated by transporting and pressurizing the material in a liquid carrier and the provision of a liquid carrier having the same composition as the stripping liquid ensures that the two liquids do not subsequently need to be separated. The loaded particulate carrier and liquid carrier may be introduced into said one end part of the stripping vessel upstream, in the direction of flow of the stripping liquid introduced to the opposite end part of the stripping vessel, of where the loaded stripping liquid is removed from said one end part of the stripping vessel.

Further according to the first aspect of the present invention there is provided a continuous elution process for stripping a value from a particulate carrier loaded with the value by means of a stripping liquid, in which the loaded particulate carrier is fed to one end part of a pressurized stripping vessel and is displaced through the stripping vessel in counterflow to the stripping liquid introduced under pressure to the opposite end part of the stripping vessel whereby the particulate carrier is stripped of the value, the unladen particulate carrier being removed from said opposite end part of the stripping vessel and the loaded stripping liquid being removed from said one end part of the stripping vessel, and wherein the loaded particulate carrier is introduced under pressure into said one end part of the stripping vessel upstream, in the direction of flow of the stripping liquid, of where the loaded stripping liquid is removed from said one end part, in a liquid carrier as a low velocity slurry from which at least a substantial part of the liquid carrier separates in the stripping vessel and is removed with the loaded stripping liquid. Introducing the particulate carrier to the stripping vessel in a low velocity slurry composed of the particulate and liquid carriers ensures that it enters the stripping vessel at low velocity whereby there is minimal carry-over of the particulate carrier in the stripping liquid removed from the one end part of the stripping vessel. It is believed that the maximum liquid carrier to particulate carrier volume ratio is of the order of 5:1 to provide the desired low velocity and the preferred ratio is about 2.5:1.

Advantageously the liquid carrier comprises the stripping liquid loaded with the value and at least a portion of the loaded stripping solution removed from the stripping vesssel may be recirculated directly for use as the liquid carrier. The use of the loaded stripping solution as the liquid carrier tends to maintain the efficiency of the process since it ensures that the loaded strip solution removed from the end part of the stripping vessel is not diluted. However it will be appreciated that in some elution processes it may not be desired to recover the value in which case dilution of its content in the stripping liquid is not a problem.

The loaded particulate carrier may be introduced to a feed vessel communicating with the stripping vessel and liquid carrier may be introduced into the feed vessel under pressure to transport the loaded particulate carrier to the stripping vessel. Such transporting may be conducted on a batch basis by introducing the loaded particulate material into the feed vessel and pumping the liquid carrier into the feed vessel under pressure until all of said particulate carrier has been transported to the stripping vessel. Charging of the particulate feed vessel may be relatively rapid compared with the flow of particulate carrier required in the stripping vessel and it may be possible therefore to provide an effectively continuous flow of particulate carrier through the latter. In order to ensure a continuous flow, a second feed vessel may be provided so that one feed vessel can be recharged while the other is feeding the particulate carrier to the stripping vessel.

The feed vessel or vessels may be located above the one end part of the stripping vessel and have means to equalise the pressure therein with that in the stripping vessel whereby the particulate carrier and liquid carrier may fall into the one end part of the stripping vessel. Preferably, however, the or each feed vessel is displaced from the stripping vessel and communicates therewith through a pipe in which the aforementioned plug may be formed. The velocity of the particulate carrier as it is introduced to the stripping vessel is a function of the length of the pipe, and therefore the pressure drop along the pipes and preferably the consistency and velocity of the slurry is such that it oozes into the stripping vessel. The unladen stripping liquid is advantageously heated to the stripping temperature, preferably in the range 120°–160° C. for stripping gold, exteriorly of the stripping vessel, which may be thermally insulated, and the removed loaded stripping liquid may be cooled by heat exchange with the unladen stripping liquid. When the liquid carrier is recirculated loaded stripping liquid, this is cooled on contact with the loaded particulate carrier to prevent flashing when pressure is released in the feed vessel. Pressure in the stripping vessel, preferably autogenous and generally of the order of 500 KPa, may be applied by the pressurized liquid carrier and may be maintained by a control valve downstream of the stripping liquid outlet from the stripping vessel.

The first aspect of the present invention also extends to apparatus for the continuous stripping of a value, such as gold, from a particulate carrier loaded with the value by means of a stripping liquid, the apparatus comprising a hollow pressurizable stripping vessel having opposed end parts, means to introduce the particulate carrier loaded with the value into one end part of the stripping vessel and means to extract the particulate carrier from the opposite end part so as to maintain a continuous flow of the particulate carrier through the vessel, means to introduce a stripping liquid into the opposite end part of the stripping vessel and to exhaust the stripping liquid from the one end of the part of the stripping vessel whereby to maintain a counterflow of stripping liquid through the vessel to strip the value from the particulate carrier, and wherein the means to introduce the loaded particulate carrier into the stripping vessel comprises a feed vessel and means communicating the feed vessel with the one end part of the stripping vessel, means capable of introducing loaded particulate carrier and a liquid carrier into the feed vessel and pressurizing means upstream of the feed vessel capable of pressurizing the liquid carrier to displace the mixture of loaded particulate carrier and liquid carrier under pressure through the communicating means to the stripping vessel.

Advantageously, the stripping vessel is columnar with the one end part being an upper end part and the opposite end part being a lower end part, so that in a preferred embodiment the value bearing particulate carrier is fed into the upper part of the stripping vessel and is allowed to move downwardly through an upward flow of stripping liquid within the stripping vessel. The stripping liquid is fed into a bottom part of the stripping vessel in a condition in which it is substantially barren of the value and is taken from the upper part of the vessel in which it is loaded with the value stripped from the particulate carrier within the vessel. The barren particulate carrier must be progressively removed from the bottom of the stripping vessel and this presents a problem since as previously indicated, generally the stripping vessel is operated at elevated temperature and pressure. It is important also that particulate carrier, particularly in the form of carbon, be cooled prior to discharge so that it is not degraded due to flashing of the stripping liquid, and some means must be provided to remove it while maintaining the pressure within the stripping vessel. This may be achieved by means of a screw extractor flushed with a flow of cooling liquid. However, use of this kind of extractor tends to degrade the carrier material because of the grinding action of the screw and a pressurized screw of this type is costly to manufacture and maintain.

Advantageously the unladen particulate material may be extracted from the lower end part of the stripping vessel through a discharge conduit by introducing a discharge liquid into the discharge conduit at a location upstream from its discharge end under such pressure as to maintain an interface of said discharge liquid with the stripping liquid upstream of said location and a flow of said discharge liquid downstream from said location to transport the particulate material through the discharge conduit to the discharge end. Such an arrangement for the particulate extraction provides the second aspect of the present invention as detailed hereinafter.

The process and apparatus in accordance with the first aspect of the present invention most desirably are used for the recovery of gold, in which case the particulate carrier may be active carbon in particle form and the stripping liquid is advantageously an aqueous solution of sodium hydroxide and/or sodium cyanide. Typically the strip solution may contain 1% sodium hydroxide and 0.1% sodium cyanide and the gold may be recovered from it by electrolysis or other suitable methods. However, it will be appreciated that the value could be any other metal, or any chemical, complex or otherwise, such as a hydrocarbon or some form of pollutant which it is desired to separate from a particulate carrier. The particulate carrier may take any suitable form and may comprise, for example, ion exchange particles. The stripping solution will be adjusted accordingly. Where it is not desired to recover the value, dilution of the value content in the loaded stripping solution will not affect the efficiency of the process and the use of a liquid carrier other than, but compatible with, the stripping liquid may be permissible.

According to the second aspect of the present invention, in its broadest sense there is provided a method of extracting particulate material from the bottom part of a pressure vessel through a discharge pipe extending from the bottom part of the vessel, comprising introducing a discharge liquid into a discharge pipe at a location upstream from its discharge end under such pressure as to maintain an interface of said discharge liquid with a circulating liquid in the pressure vessel upstream of said location and a flow of said discharge liquid downstream from said location to transport particulate material through the discharge pipe to the discharge end.

By the second aspect of the present invention the particulate material may be extracted from the pressure vessel in such a manner that it is depressurized prior to discharge and is not mechanically broken down. Furthermore the discharge liquid may be used to cool the particulate material prior to discharge.

The discharge of the particulate material may be controlled by a valve, which is advantageously adjustable for differing particle sizes, which is capable of retarding and controlling the flow of particulate material while permitting the free flow of the discharge liquid from the discharge pipe. The discharge rate will depend on the length of the discharge pipe and therefore on the pressure drop between the pressure vessel and the discharge end. The interface between the discharge and circulating liquids is preferably located in the bottom part of the pressure vessel.

The second aspect of the present invention also extends to a continuous elution process for stripping a value from a particulate carrier by means of a stripping liquid, wherein the loaded particulate carrier is fed to an upper part of a pressurized stripping vessel and is allowed to move downwardly through an upward flow of the stripping liquid within the pressurized stripping vessel and the particulate material is extracted from the pressurized stripping vessel by the method defined above in accordance with the second aspect of the invention. This may enable extraction of the carrier in such a manner that it may be steadily cooled and depressurized prior to discharge and in which most of the strip solution may be separated from it and retained in the pressure vessel and not be lost with the discharged particulate material.

Although the method in accordance with the second aspect of the present invention has particular application to the elution process defined in the immediately preceding paragraph it is not limited to that application and it may be applied to other processes in which it is necessary to remove particulate material from a pressure vessel. It may, for example, be used for the extraction of resin beads from ion exchange vessels or for the extraction of ceramic beads or other particulate material from packed towers in oil refineries for catalytic cracking or other chemical reaction processes.

Preferably the elution process in accordance with the second aspect of the present invention is used in the extraction of gold in which case the particulate carrier may comprise carbon particles and the stripping liquid may comprise an aqueous solution of sodium hydroxide and/or sodium cyanide as aforedescribed with reference to the first aspect of the invention.

The invention also provides apparatus for the continuous stripping of a value, such as gold, from a particulate carrier loaded with the value by means of a stripping liquid, the apparatus comprising a hollow columnar stripping vessel and means to pressurize the vessel; means to introduce the loaded particulate carrier into an upper part of the stripping vessel and to extract the particulate carrier from a bottom part of the stripping vessel so as to maintain a downward flow of the particulate carrier within the stripping vessel; and means to introduce a stripping liquid into the bottom part of the stripping vessel and to exhaust the stripping liquid from the upper part of the stripping vessel whereby to maintain an upward flow of stripping liquid within the stripping vessel to strip the value from the downwardly moving particulate carrier; wherein the means to extract particulate carrier from a bottom part of the stripping vessel comprises a discharge pipe extending from the bottom part of the vessel to a discharge end and means to introduce a discharge liquid into said discharge pipe at a location upstream from its discharge end to establish an interface of discharge liquid with stripping liquid upstream of said location and a flow of discharge liquid in the discharge pipe downstream of said location to carry particulate carrier therethrough to the discharge end.

In operation of the apparatus described immediately above, it is possible to establish a well defined interface between the discharge liquid and the stripping liquid while at the same time producing a flow of discharge liquid in the discharge pipe to carry particulate material through the pipe thereby providing for positive extraction of that material and a downward movement of material through the discharge liquid in the bottom part of the vessel where it is washed substantially free of stripping liquid. Loss of stripping liquid is therefore minimized.

In order that each aspect of the present invention may be more fully explained one particular embodiment, together with a modification thereto will be described in some detail, by way of example only with reference to the accompanying drawings in which:

FIG. 4 is a flow diagram showing part of FIG. 1 but modified to provide two carbon particle introducing vessels.

Similarly numbered elements in the Figures are identical and, for convenience, are not necessarily described in relation to each of the Figures.

Figure 1:
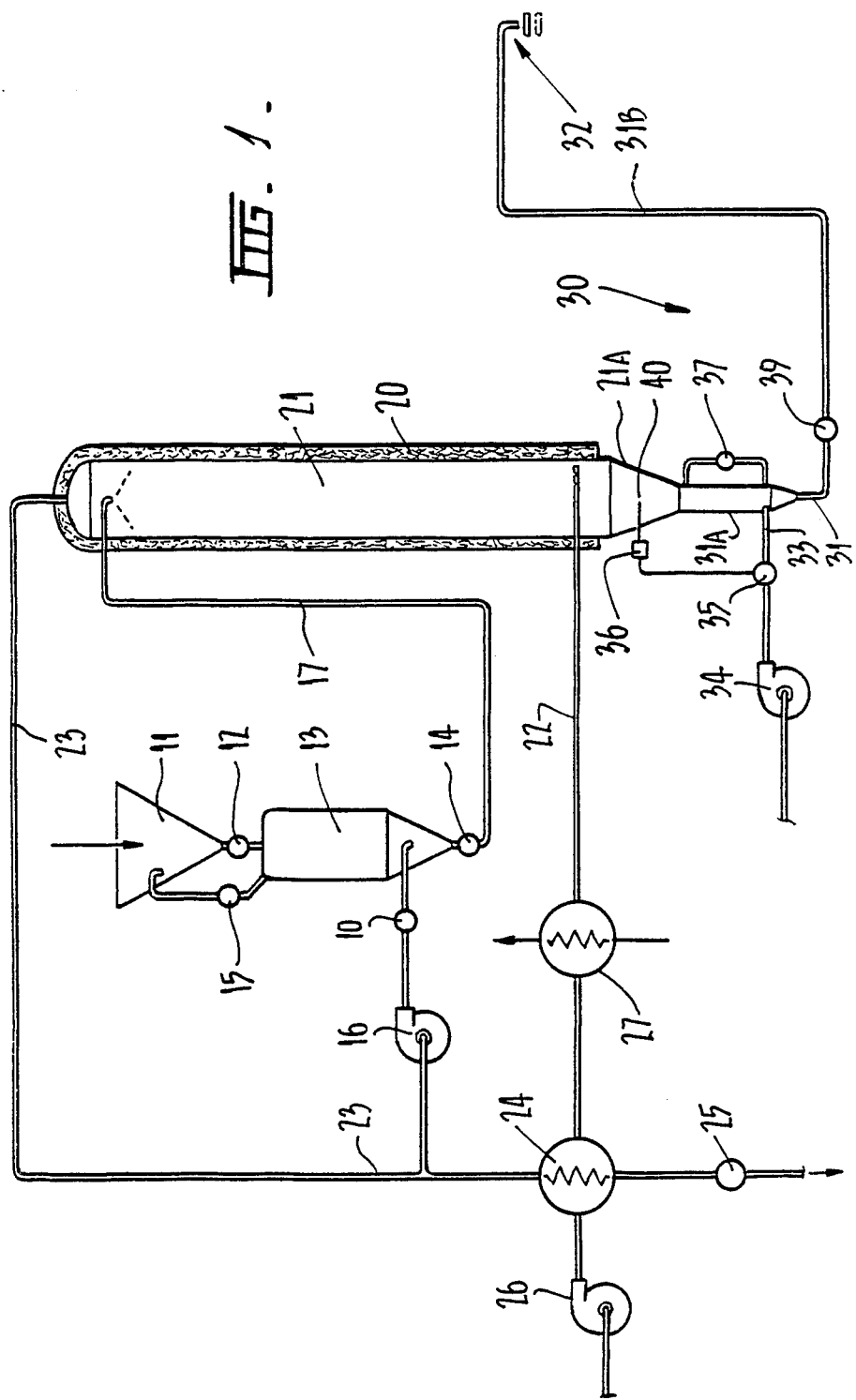
FIG. 1 is a flow diagram for a continuous gold extraction process in which particulate carbon is introduced to and extracted from a pressure vessel in accordance with respective aspects of the invention.

FIG. 1 is a process flow diagram for a gold extraction process in which gold is continuously stripped from particulate carbon by means of a stripping liquid. As shown in this diagram the particulate carbon loaded with gold is fed at atmospheric pressure into a hopper 11 possibly via a dewatering screen (not shown), from which it is discharged by gravity through a valve 12 into a carbon feed vessel 13 on a batch basis. During charging of feed vessel 13 with carbon, a valve 14 at the discharge side of that vessel and a liquid carrier input valve 10 are closed, and a balancing valve 15 communicating between the feed vessel and the hopper, in parallel with the valve 12, is opened to provide for pressure balancing between the feed vessel and the hopper.

When the feed vessel has been charged with carbon, preferably to at least half full, the valves 12 and 15 are closed, the feed vessel is pressurized with the liquid carrier comprising stripping liquid via a boost pump 16 by opening input valve 10 and the discharge valve 14 is opened. The loaded particulate carbon is thus fed with stripping liquid through line 17 into the upper part of a hollow columnar stripping vessel 21. Stripping liquid is pumped into the feed vessel 13 until all the particulate carbon has been carried therefrom by the liquid, at which time the liquid input valve 10 and valve 14 are closed. Feed vessel 13 is then essentially full of stripping liquid, under pressure, and opening the balancing valve 15 permits pressure relief in the feed vessel as further particulate carbon is introduced through opened valve 12. The valve 12 may have a diameter 150 mm and the balancing valve 15 a diameter of 75 mm. If no balancing valve is provided the valve 12 may have to have a diameter of the order of 300 mm to permit the stripping liquid to flow upwards as the carbon particles flow downwards through it.

Charging of the carbon feed vessel 13 may be relatively rapid compared with the flow of carbon required in the stripping vessel 21 and it is therefore possible to provide an effectively continuous flow of carbon through the stripping vessel. In order to ensure a continuous flow, a second feed vessel with ancillary hopper and valves may be provided so that one feed vessel can be recharged while the other is feeding carbon to the stripping vessel. Such a modification is illustrated in FIG. 4 and will be described in greater detail hereinafter.

The length of the line 17 and the maximum liquid carrier to particulate carbon volume ratio of about 5:1 (preferably about 2.5:1) ensure that there is a sufficient pressure drop along the line for the dense phase, or slurry, of the particulate carbon in liquid carrier to form which oozes slowly into the stripping vessel 21. Such low input velocity ensures that there is minimal carry-over of particulate carbon into a stripping liquid outlet from the stripping vessel. If it is desired to increase the volume of carbon entering the stripping vessel 21, the cross-sectional area of the line 17 may be increased. Introducing the carbon in a liquid carrier reduces any grinding action on the carbon particles and therefore minimises production of carbon fines which would not be suitable for use in separating gold from the gold ore in the recovery process. Pressurizing the liquid carrier upstream of the feed vessel 13 also minimizes the production of fines and while pumps are known through which particulate material can pass without being degraded, maintaining the desired low velocity of the material passing therethrough is not believed to be practical with such pumps.

Within the stripping vessel 21 there is a continuous counter-current flow of particulate carbon and stripping liquid, which may be an aqueous solution of sodium hydroxide and sodium cyanide. Typically, this stripping solution may comprise one percent sodium hydroxide and 0.1 percent sodium cyanide. The stripping solution may be heated by heater 27 to a temperature in the range of 120° to 160° C. prior to entering the stripping vessel via line 22, and the vessel is provided with insulation 20 so as to maintain the elevated temperature necessary for the reaction to proceed, thereby removing the necessity to otherwise heat the stripping vessel and allowing the total volume of the vessel to be maintained at the desired temperature for the reaction to proceed. It has been found that there may be a temperature drop of 5°–10° through the stripping vessel.

The loaded carbon enters the upper part of the stripping vessel and moves slowly downward, giving up gold to the stripping solution which enters as a barren solution at the bottom part of the stripping vessel through the line 22 and leaves through a line 23 at the top of the vessel as loaded stripping solution. The line 17 introduces the loaded particulate carbon to the stripping vessel upstream, in the direction of flow of the stripping liquid, of the junction of line 23 with the vessel, also to minimize carry-over of carbon into line 23.

The loaded stripping solution leaving the top of the stripping vessel through line 23 comprises new loaded stripping solution and recirculated loaded stripping solution which was used to carry the carbon into the stripping vessel. The use of loaded stripping solution to carry carbon into the stripping vessel ensures that the rich stripping solution does not have its gold-content diluted by the fluid carrying the carbon. Part of the loaded strip solution leaving the top of the vessel 21 is directed through pump 16 to feed vessel 13 to act as the liquid carrier as previously described. The liquid carrier is still hot as it enters the feed vessel and gives much of its heat to the particulate carbon entering the feed vessel and pumped with the liquid carrier through the line 17. Thus the carbon entering the strip vessel 21 is also heated whereby the reaction temperature at the top of the vessel may be maintained. Since the liquid carrier gives up a substantial part of its heat to the carbon, there is minimal risk of flashing from the liquid carrier remaining in the feed vessel 13, after the carbon has been carried therefrom, when the valves 15 and 12 are opened to allow pressure balancing and the introduction of more carbon. Introducing a greater volume of carbon to the vessel 21 will tend to increase any temperature drop through the vessel.

The remainder of the loaded stripping solution leaving the upper part of the stripping vessel is cooled in an economizer 24 so that it does not flash when its pressure is reduced to atmospheric through a pressure control valve 25 prior to entering a series of electrowinning cells or zinc precipitation vessels (not shown) in which the gold is extracted.

Barren stripping solution from the electrowinning cells and/or new barren stripping solution is pumped via a pump 26 into the bottom part of the stripping vessel through the line 22 via the economizer 24, to receive heat from the extracted loaded stripping solution, and via the heater 27 to boost the temperature, as required, to of the order of 150° C. Heater 27 may be a dry steam heater or any other suitable heater. The stripping vessel pressure is determined by the rich stripping solution pressure control valve 25, and is preferably of the order of 500 KPa. Barren or partially stripped stripping solution may also be introduced into the vessel 21 part-way up the height thereof to maintain the reaction temperature and/or to ensure complete stripping of the downwardly flowing carbon.

Figure 2:
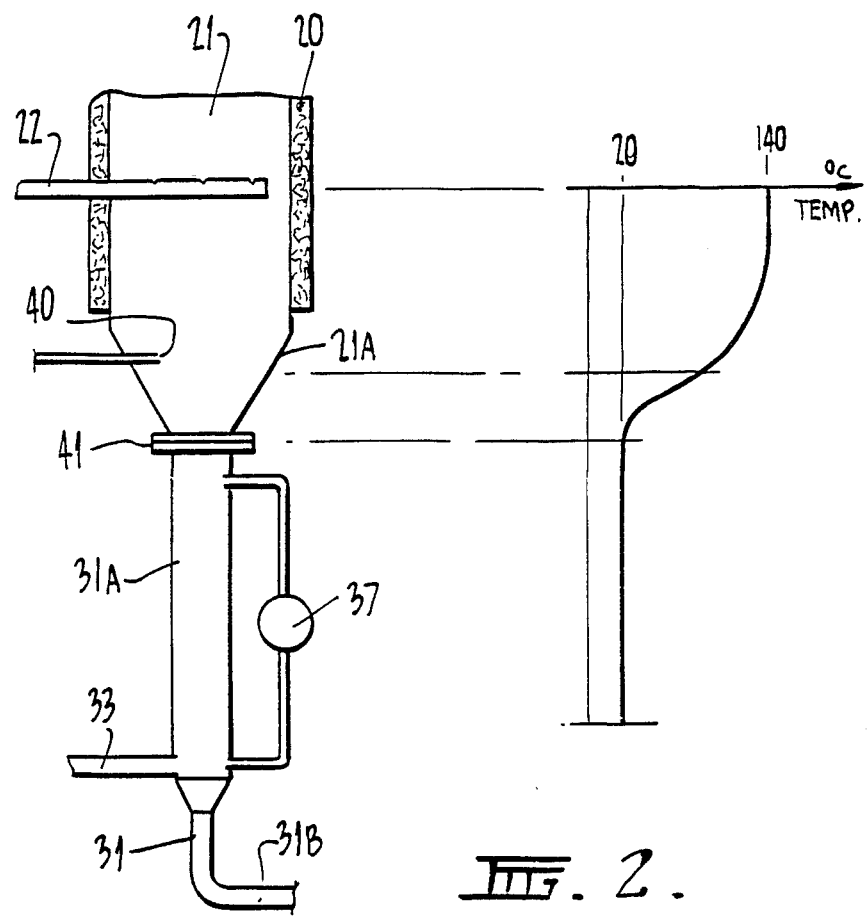
FIG. 2 illustrates the carbon extraction system together with a temperature profile established in the bottom part of the pressure vessel.
Figure 3:
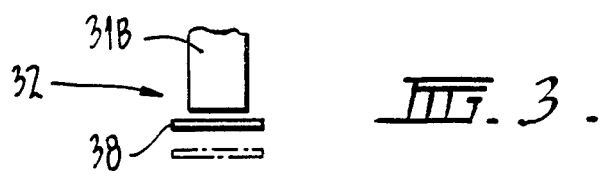
FIG. 3 is a detail view of a valve incorporated in the carbon extraction system.

Barren carbon is removed from the bottom of the stripping vessel 21 by a carbon extraction system 30 which is constructed and operated in accordance with the second aspect of the present invention and which will now be described with particular reference to FIGS. 2 and 3.

Carbon extraction system 30 comprises an extraction pipe 31 connected to an inverted frustoconical bottom portion 21A of stripping vessel 21 by a flange connector 41. The barren stripping liquid is introduced to the bottom part of the stripping vessel 21 via line 22 above the bottom portion 21A. Extraction pipe 31 comprises a vertical section 31A connected to the bottom portion 21A of the stripping vessel and a longer section 31B of reduced diameter (see FIG. 1) extending to a discharge valve 32, which is conveniently elevated, for discharge into a carbon regeneration vessel (not shown). A shut-off valve 39 is provided in pipe section 31B to stop the discharge of barren carbon.

The bottom end of extraction pipe section 31A is provided with a branch pipe 33 for the input of a flow of cooling water delivered by a pump 34 (FIG. 1) through a valve 35 controlled by a temperature controller 36 having a temperature sensor 40 in the bottom portion 21A of the stripping vessel, or just below the portion 21A in the pipe section 31A. By suitably adjusting the flow of cooling water, it is possible to balance the pressure within the stripping vessel with a head of cooling water extending up into the bottom part of the stripping vessel and a flow of cooling water along the extraction pipe 31 downstream from inlet pipe 33 so that the carbon is positively extracted with the flow of water and is cooled by the cooling liquid. Such balance is also dependent upon the length of the extraction pipe 31 since this is packed with carbon having a pressure drop along the length of the pipe, the carbon restraining the flow of water through the pipe 31 and thereby creating a head of water.

The flow of cooling liquid may initially be set by reference to a differential pressure gauge 37 which has measuring openings at the top and bottom of the vertical section 31A of the extraction pipe to give a zero reading when the water flow balances the pressure head in the column. When a steady-state condition is achieved there will be a well defined interface between the zone of cooling water in the bottom portion 21A of the stripping vessel and the hot stripping liquid, with a corresponding temperature profile as shown in FIG. 2. The sensor 40 of temperature controller 36 is located at the position of maximum temperature gradient so that any tendency for the interface to move up or down will produce a large shift of the measured temperature. Thus the temperature can be used to control valve 35 to vary the flow of cooling water in order to maintain a stable interface between the cooling water and the stripping liquid. The gauge 37 may be set at zero when the discharge valve 32 is closed and then a slight differential pressure introduced so that when the valve is opened and the downwards flow of carbon lowers the interface, the interface may then be at the desired level. Although the interface must be maintained below the level of line 22, in practice there is a slight upflow of cold water beyond this level. As the carbon passes downwardly it carries hot stripping liquid with it which is gradually displaced by the cool water. The displaced warm stripping liquid is then carried upwards by convection with more cool water.

Discharge valve 32 comprises a flat plate 38 disposed across the open end of the extraction pipe section 31B with a small gap between the two. The plate is movable towards and away from the end of the pipe so that the gap can be adjusted according to the carbon particle size in order to retard and control the flow of carbon while permitting free flow of cooling liquid from the pipe. The gap is conveniently controlled automatically by a carbon level sensor (not shown) in the stripping vessel. The gap may be varied typically between 2 mm to 20 mm for particulate material in the range 6–16 mesh.

In the illustrated carbon extraction system, the carbon is cooled from the reaction temperature to approximately ambient so that it is not degraded due to flashing of solution within the carbon as the external pressure is reduced. Degradation of the carbon is further minimized by the progressive reduction of pressure along the length of the extraction pipe. The pressure drop is maintained by a near constant flow of cooling water through the carbon packed in the pipe. Discharge valve 32 allows this near constant flow of water to pass at varying carbon flow rates. Thus, the gold-depleted particulate carbon is cooled as it passes through the cooling water interface but enters the pipe 31 at high pressure which is relieved in pipe 31 so that it may be discharged through the valve 32 at ambient temperature and pressure. It has been found that with careful selection of the parameters, such as the length and diameters of the pipe 31 and the cooling water flow rate, it is possible to control conditions within the pipe 31 so that only a small proportion of the gold depleted carbon discharged through the valve 32 is fines. Furthermore it has been found that the concentration of stripping liquid in the discharged cooling liquid is 1/20 of the concentration of the liquid input at line 22 so that the extraction system is efficient in displacing the stripping liquid from the carbon.

It is believed that under such conditions the particulate carbon is drawn through the pipe 31 by the cooling water rather than being pushed or forced by the combination of the weight of carbon above and the pressure difference between the stripping vessel and the discharge end which may otherwise occur. Such pushing or forcing is believed to produce localised compacting and high pressure regions which reduce the particulate carbon into fines.

It may be desirable to adopt different types of valve at the discharge end of the extraction pipe. This is particularly the case where the area of the pipe is changed to accommodate a different volume flow of carbon and it is necessary to maintain the free flow of discharge liquid. Other conceivable forms of valve are a bell-shaped end portion of the pipe 31 which defines an annulus of the desired area which may be opened or closed by a plate or, for example, a grid which permits the flow of liquid but only the flow of carbon when open.

The optimum length and diameter of the extraction pipe are a function of the following parameters:
1. The differential pressure between the ends of the pipe, which depends on the pressure within the column.
2. The particle size distribution and shape factor of the carbon particles, which affect the extent to which they flow or tend to clog in the pipe.
3. The required discharge rate of material.

Although the system can be designed by appropriate calculations, the optimum sizes and flow rates for any particular system will usually need to be determined by trial and experiment.

In one particular arrangement the stripping vessel 21 is 11 meters high and has an internal diameter of 300 mm, and is operated at the autogenous pressure of about 500 KPa at a temperature in the range 120°–160° C. A temperature of less than 120° C. means the stripping reaction is too slow and of more than 160° C. may create difficulties in heating the solution. Barren stripping solution at the desired temperature of about 150° C. is introduced to the stripping vessel via line 22 at a rate of about 10 l/min at the desired operating pressure of about 500 KPa. The stripping solution passes upwardly through the particulate carbon in the stripping vessel and is extracted therefrom via line 23 at a pressure of the order of 400 KPa, controlled by the valve 25.

Particulate carbon loaded with gold, of a particle size of 6 to 16 mesh is fed batchwise to the feed vessel 13 so that it at least half fills the feed vessel. Hot loaded stripping solution is pumped into the vessel 13 by the boost pump 16 at a pressure which may be about double the stripping vessel pressure and is preferably in the range 800–900 KPa, and valve 14 is opened so that the mixture flows through line 17 in a solution to carbon volume ratio of preferably 2:1 to 2.5:1. Advantageously, such ratio is not higher than 5:1 since the flow velocity may then be too high so that there is excessive carry-over of carbon into line 23. Barren carbon flow from the discharge valve 32 may be at rate of 0–100 kg/hr. Discharge pipe section 31A may have a height of 1200 mm and an internal diameter of 100 mm while section 31B may have a length of 6000 mm and an internal diameter of 40 mm. The cold water inlet line 33 introduces water at a temperature of 20° C. and at a pressure of 600 KPa at a rate of 5 l/min to the bottom of the pipe section 31A. The flow rate is controlled by the temperature controller 36 to maintain the correct temperature gradient. Of that cold water flow rate of 5 l/min, approximately 20% passes upwardly in the pipe section 31A to produce the water/stripping solution interface and the remainder flows along the pipe section 31B to be discharged freely at the discharge valve 32.

Increasing the stripping vessel height effectively increases the time taken for the stripping and discharge process. Increasing the diameter of the vessel by a factor of 5, however, increases the flow rates by approximately a factor of 25. Thus increasing the diameter to 1500 mm may give a stripped carbon discharge rate of 1 tonne per hour and this has been found to require a stripping liquid input flow rate of 6 l/sec and a discharge liquid input flow rate of 3 l/sec, as well as suitable increases in carbon input flow volumes.

In the modification disclosed in FIG. 4, the flow of carbon to the stripping vessel 21 is made continuous by the provision of two identical feed vessels 13 and 13' in parallel. While the feed vessel 13 is discharging its particulate carbon content as aforedescribed, valves 10' and 14' of feed vessel 13' are closed and valves 12' and 15' are open so that carbon in hopper 11' passes into the vessel 13' and excess stripping solution in the vessel 13' is relieved through balancing valve 15'. As soon as all the carbon in feed vessel 13 has been removed valves 10, 14, 12' and 15' are closed and valves 10' and 14' are opened so that the pressurized flow of stripping solution from pump 16 is directed to feed vessel 13' and the carbon therein is carried through valve 14' and line 17 to the stripping vessel. In the meantime feed vessel 13 is loaded with carbon and as soon as feed vessel 13' has been emptied of its carbon contents the operation is reversed.

It is understood that the information, and particularly the constructional and flow details given herein are by way of example only and that many variations will fall within the spirit and scope of the invention as defined in the appended claims.

What is claimed is:

1. A continuous elution process for stripping at elevated temperature a value from a particulate carrier loaded with the value by means of a stripping liquid passing through a pressurized stripping vessel having opposite end parts, in which the loaded particulate carrier is fed to one end part of the stripping vessel and is displaced through the stripping vessel in counterflow to the stripping liquid introduced under pressure to the other end part of the stripping vessel whereby the particulate carrier is stripped of the value, the unladen particulate carrier being removed from said other end part of the stripping vessel at a location spaced from the input of said stripping liquid at the other end part and the loaded stripping liquid being removed from said one end part of the stripping vessel, and wherein the loaded particulate carrier is introduced under pressure through input pipe means into said one end part of the stripping vessel upstream, in the direction of flow of the stripping liquid, of where the loaded stripping liquid is removed from said one end part in a liquid carrier as a low velocity slurry having a maximum liquid carrier to particulate carrier volume ratio of 5:1 from which at least a substantial part of the liquid carrier separates in the stripping vessel and is removed with the loaded stripping liquid, and wherein the slurry is formed by feeding the loaded particulate carrier to a feed vessel communicating with the input pipe means and pumping the liquid carrier through the particulate carrier in the feed vessel and into the input pipe means under pressure until substantially all of said particulate carrier has been carried from the feed vessel into the input pipe means by the liquid carrier.

2. A process as claimed in claim 1 in which the liquid carrier comprises the stripping liquid loaded with the value.

3. A process as claimed in claim 2 in which at least a portion of the loaded stripping liquid removed from the stripping vessel is recirculated directly for mixing as the liquid carrier with the loaded particulate carrier.

4. A process as claimed in claim 3 in which the stripping liquid recirculated to the feed vessel as the liquid carrier is at elevated temperature and is percolated through the particulate carrier in the feed vessel whereby excess liquid carrier remaining in the feed vessel after the particulate carrier has been discharged therefrom is cooled below flashing temperature.

5. A process as claimed in claim 1 in which a mixture of loaded particulate carrier and liquid carrier is pumped under pressure from a second feed vessel into the input pipe means while the first-mentioned feed vessel is being charged.

6. A process as claimed in claim 1 in which heated loaded stripping liquid removed from said one end part the stripping vessel is cooled by heat exchange with unladen stripping liquid to be introduced to the stripping vessel at said other end part.

7. A process as claimed in claim 1 in which the unladen stripping liquid is heated to the stripping temperature exteriorly of the stripping vessel.

8. A process as claimed in claim 1 in which the loaded stripping liquid removed from the stripping vessel is passed through a pressure control valve to reduce the pressure of the removed stripping liquid, and wherein the pressure control valve is used to control the pressure in the stripping vessel.

9. A process as claimed in claim 1 in which the stripping vessel pressure is about 500 KPa.

10. A process as claimed in claim 1 in which the stripping vessel is columnar with the one end part being an upper end part and the opposite end part being a lower end part, and wherein the unladen particulate carrier is extracted from the lower end part of the stripping vessel through a discharge conduit by introducing a discharge liquid into the discharge conduit at a location upstream from its discharge end under such pressure as to maintain an interface of said discharge liquid with the stripping liquid upstream of said location at a flow of said discharge liquid downstream from said location to transport the particulate carrier through the discharge conduit to the discharge end.

11. A process as claimed in claim 10 in which said interface is maintained below the level at which the unladen stripping liquid is introduced into the bottom end part of the stripping vessel.

12. A process as claimed in claim 10 in which said discharge liquid is water.

13. A process as claimed in claim 1 in which the value is gold.

14. A process as claimed in claim 13 in which the particulate carrier comprises carbon particles and the stripping liquid comprises an aqueous solution of sodium hydroxide and/or sodium cyanide.

15. Apparatus for the continuous stripping of a value from a particulate carrier loaded with the value by means of a stripping liquid, the apparatus comprising a hollow pressurisable stripping vessel having opposite end parts, means to introduce the particulate carrier loaded with the value into one end part of the stripping vessel and means to extract the particulate carrier from the other end part so as to maintain a substantially continuous flow of the particulate carrier through the vessel, means to introduce a stripping liquid under pressure into the other end part of the stripping vessel separate from the particulate carrier extracting means and means to exhaust the stripping liquid from the one end part of the stripping vessel whereby to maintain a counterflow of stripping liquid through the vessel to strip the value from the particulate carrier, and means to heat the stripping liquid externally of the stripping vessel and wherein the means to introduce the loaded particulate carrier into the stripping vessel comprises at least one feed vessel and inlet pipe means communicating the feed vessel with the one end part of the stripping vessel upstream, in the direction of flow of the stripping liquid through the stripping vessel, of the location at which the stripping liquid is exhausted from the stripping vessel, means to introduce loaded particulate carrier into the feed vessel, means to introduce a liquid carrier into the feed vessel and pressurizing means upstream of the feed vessel capable of pressurizing the liquid carrier to displace the mixture of loaded particulate carrier and liquid carrier under pressure through the inlet pipe means to enter the stripping vessel as a low velocity slurry having a maximum liquid carrier to particulate carrier volume ratio of 5:1.

16. Apparatus as claimed in claim 15 which includes two feed vessels capable of receiving loaded particulate carrier and liquid carrier and each communicating with the inlet pipe means, and control means whereby while one feed vessel is charged with loaded particulate carrier, the other feed vessel containing loaded particulate carrier is pressurized with the liquid carrier to discharge its contents into the inlet pipe means.

17. Apparatus as claimed in claim 15 in which said at least one feed vessel includes balancing valve means to relieve pressure therein prior to and during the introduction of the loaded particulate carrier.

18. Apparatus as claimed in claim 15 in which the means to exhaust the stripping liquid from the stripping vessel comprises a loaded stripping liquid conduit which divides to permit at least part of said exhausted loaded stripping liquid to be directed to said at least one feed vessel.

19. Apparatus as claimed in claim 15 in which pressure control means to depressurize the loaded stripping liquid externally of the stripping vessel is provided in the means to exhaust the stripping liquid from the stripping vessel.

20. Apparatus as claimed in claim 15 which includes heat exchange means to transfer heat from the exhausted loaded stripping liquid to the unladen stripping liquid prior to introduction to the stripping vessel.

21. Apparatus as claimed in claim 15 in which the stripping vessel is thermally insulated.

22. Apparatus as claimed in claim 15 in which the stripping vessel is columnar with the one end part being an upper end part and the other end part being a lower end part.

23. Apparatus as claimed in claim 22 which includes a particulate carrier discharge conduit having a discharge end and extending from the lower end part of the stripping vessel, and means to introduce a discharge liquid into the discharge conduit at a location upstream from its discharge end at such a pressure as to maintain an interface of discharge liquid and stripping liquid upstream of said location and a flow of discharge liquid downstream from said location.

24. A method of extracting particulate material from the bottom part of a pressure vessel through a discharge pipe extending from the bottom part of the vessel, and through which pressure vessel a circulating liquid is passed, said circulating liquid being introduced to the bottom part of the pressure vessel at a location above said discharge pipe and being extracted from the pressure vessel at a location above said introduction location, said method comprising introducing a discharge liquid into the discharge pipe at a location upstream from its discharge end under such pressure as to maintain an interface of said discharge liquid with said circulating liquid between said discharge liquid introduction location and said circulating liquid introduction location, and to maintain a flow of said discharge liquid downstream from said discharge liquid introduction location to transport particulate material through the discharge pipe to the discharge end.

25. A method as claimed in claim 24 in which the liquid interface is disposed in the pressure vessel.

26. A method as claimed in claim 24 in which the particulate material is discharged from the discharge end of the discharge pipe through a valve capable of retarding and controlling the flow of particulate material while permitting free flow of the discharge liquid from the discharge end.

27. A method as claimed in claim 26 in which the valve is adjustable.

28. A method as claimed in claim 24 in which the particulate material in the pressure vessel is heated and the discharge liquid serves to cool the particulate material as the latter is discharged.

29. A continuous elution process for stripping a value from a particulate carrier by means of a stripping liquid passing through a pressurized stripping vessel having upper and lower end parts, wherein the loaded particulate carrier is fed to the upper end part of the stripping vessel and is allowed to move downwardly through an upward flow of the stripping liquid within the stripping vessel and further wherein the particulate material is extracted from the bottom part of the pressurized stripping vessel by the method claimed in claim 24 in which the circulating liquid comprises the stripping liquid.

30. A process as claimed in claim 29 in which the particulate material comprises carbon particles.

31. A process as claimed in claim 29 in which the value comprises gold and the stripping liquid comprises an aqueous solution of sodium hydroxide and/or sodium cyanide.

32. Apparatus for the continuous stripping of a value from a particulate carrier loaded with the value by means of a stripping liquid, the apparatus comprising a hollow columnar stripping vessel and means to pressurize the vessel; means to introduce the loaded particulate carrier into an upper part of the stripping vessel and to extract the particulate carrier from a bottom part of the stripping vessel so as to maintain a downward flow of the particulate carrier within the stripping vessel; and means to introduce a stripping liquid into the bottom part of the stripping vessel and means to exhaust the stripping liquid from the upper part of the stripping vessel whereby to maintain an upward flow of stripping liquid within the stripping vessel to strip the value from the downwardly moving particulate carrier, said particulate carrier introduction means being located upstream, in the direction of flow of the stripping liquid through the stripping vessel, of the location at which the stripping liquid is exhausted from the stripping vessel; wherein the means to extract particulate carrier from a bottom part of the stripping vessel comprises a discharge pipe extending from the bottom part of the vessel below the stripping liquid introduction means to a discharge end and means to introduce a discharge liquid into said discharge pipe at a location upstream from its discharge end to establish an interface of discharge liquid with stripping liquid between said discharge liquid introduction means and said stripping liquid introduction means and a flow of discharge liquid in the discharge pipe downstream of said location to carry particulate carrier therethrough to the discharge end.

33. Apparatus as claimed in claim 32 in which a valve is provided at said discharge end of the discharge pipe which is capable of retarding and controlling the flow of particulate material from the discharge end while permitting the free flow of discharge liquid therefrom.

34. Apparatus as claimed in claim 32 in which the discharge pipe comprises an upright section connected to the bottom part of the stripping vessel and an elongate section between the upright section and the discharge end which is of smaller cross-section than the upright section, and wherein said location is in the upright section.

35. Apparatus as claimed in claim 34 which includes a differential pressure gauge adapted to measure flow of the discharge liquid above said location in the upright section of the discharge pipe.

36. Apparatus as claimed in claim 32 which includes a temperature sensor capable of determining the temperature of the particulate material upstream of said location and wherein said means to introduce the discharge liquid includes a valve controlled by said temperature sensor.

* * * * *